(12) United States Patent
Chhibber et al.

(10) Patent No.: US 11,329,907 B2
(45) Date of Patent: May 10, 2022

(54) ESTABLISHING A MULTICAST FLOW PATH THROUGH A NETWORK USING MULTICAST RESOURCES CURRENTLY ASSOCIATED WITH A DIFFERENT MULTICAST FLOW PATH

(71) Applicant: Cisco Technology, Inc., San Jose, CA (US)

(72) Inventors: Rishi Chhibber, Dublin, CA (US); Roshan Lal, San Jose, CA (US); Mankamana Prasad Mishra, San Jose, CA (US)

(73) Assignee: Cisco Technology, Inc., a California corporation, San Jose, CA (US)

( * ) Notice: Subject to any disclaimer, the term of this patent is extended or adjusted under 35 U.S.C. 154(b) by 0 days.

(21) Appl. No.: 16/946,021

(22) Filed: Jun. 2, 2020

(65) Prior Publication Data

US 2021/0377153 A1 Dec. 2, 2021

(51) Int. Cl.
*H04L 12/761* (2013.01)
*H04L 45/16* (2022.01)
*H04L 45/50* (2022.01)

(52) U.S. Cl.
CPC .............. *H04L 45/16* (2013.01); *H04L 45/50* (2013.01)

(58) Field of Classification Search
CPC ................................ H04L 45/16; H04L 45/50
See application file for complete search history.

(56) References Cited

U.S. PATENT DOCUMENTS

| | | | |
|---|---|---|---|
| 9,306,758 | B2 | 4/2016 | Kollipara et al. |
| 9,319,962 | B2 | 4/2016 | Wetterwald et al. |
| 9,391,704 | B2 | 7/2016 | Gerstel et al. |
| 9,743,151 | B2 | 8/2017 | Ierson et al. |
| 9,807,035 | B1 | 10/2017 | Hanks et al. |

(Continued)

OTHER PUBLICATIONS

Zhang et al., "RSPV: A New Resource Reservation Protocol, Novel design features lead to an Internet protocol that is flexible and scalable," Sep. 1993, IEEE Network, IEEE Society, Piscataway, NJ, pp. 8-18.

(Continued)

*Primary Examiner* — Donald L Mills
(74) *Attorney, Agent, or Firm* — Polsinelli PC

(57) ABSTRACT

In one embodiment, resource availability reallocation is used in establishing one or more new designated multicast flow paths with guaranteed availability of resources currently allocated and/or used by one or more designated existing multicast flow path to allocate/use for the new designated flow path(s). These resources typically include allocated guaranteed bandwidth of a network path between two adjacent or non-adjacent nodes of the network, and possibly forwarding/processing/memory resources of a network node. One embodiment communicates multicast control messages between nodes identifying to establish a new multicast flow path with resource availability reallocation from a designated multicast flow path. In one embodiment, a Protocol Independent Multicast-Sparse Mode (PIM-SM) Join/Prune Message identifies Pruning of one or more multicast flow paths and Joining of one or more different multicast flow paths and designating resource availability reallocation from these Pruned multicast flow path(s) to these Joined multicast flow path(s).

22 Claims, 11 Drawing Sheets

(56) References Cited

U.S. PATENT DOCUMENTS

| | | | |
|---|---|---|---|
| 10,608,924 | B2 | 3/2020 | Pathikonda et al. |
| 2009/0161674 | A1 | 6/2009 | Bou-Diab et al. |
| 2014/0016457 | A1* | 1/2014 | Enyedi .................... H04L 45/22 370/225 |
| 2014/0241352 | A1* | 8/2014 | Kollipara .............. H04L 45/507 370/390 |
| 2014/0254590 | A1 | 9/2014 | Yang et al. |
| 2015/0127701 | A1 | 5/2015 | Chu et al. |
| 2015/0172070 | A1* | 6/2015 | Csaszar ............... H04L 12/1863 370/218 |
| 2015/0188722 | A1 | 7/2015 | Bhagavathiperumal et al. |
| 2016/0285932 | A1 | 9/2016 | Thyamagundalu et al. |
| 2016/0359878 | A1 | 12/2016 | Prasad et al. |
| 2017/0026266 | A1 | 1/2017 | Krutsch et al. |
| 2017/0244630 | A1 | 8/2017 | Levy et al. |
| 2018/0041578 | A1 | 2/2018 | Lee et al. |
| 2018/0091473 | A1 | 3/2018 | Wijnands et al. |
| 2019/0014033 | A1 | 1/2019 | Keesara et al. |
| 2019/0036717 | A1* | 1/2019 | Kebler .................... H04L 12/18 |
| 2019/0097944 | A1 | 3/2019 | Kotalwar et al. |
| 2021/0092045 | A1* | 3/2021 | Nagarajan ............... H04L 45/66 |

OTHER PUBLICATIONS

"Cisco IP Fabric for Media, Design Guide," Jul. 2019, https://www.cisco.com/c/en/us/products/collateral/switches/nexus-9000-series-switches/white-paper-c11-738605.pdf, Cisco Systems, Inc., San Jose, CA, USA (forty-eight pages).

"IP Multicast Technology Overview," Apr. 2002, https://www.cisco.com/c/en/us/td/docs/ios/solutions_docs/ip_multicast/White_papers/mcst_ovr.pdf, Cisco Systems, Inc., San Jose, CA, USA (twenty-four pages).

Venaas et al., "Hierarchical Join/Prune Attributes," RFC 7887, Jun. 2016, The Internet Society, Reston, VA, USA (eight pages).

Fenner et al., "Protocol Independent Multicast—Sparse Mode (PIM-SM): Protocol Specification (Revised)," RFC 7761, Mar. 2016, The Internet Society, Reston, VA, USA (137 pages).

Wijnands et al., "Multipoint LDP In-Band Signaling for Point-to-Multipoint and Multipoint-to-Multipoint Label Switched Paths," RFC 6826, Jan. 2013, The Internet Society, Reston, VA, USA (twelve pages).

Cai et al., "Protocol Independent Multicast Equal-Cost Multipath (ECMP) Redirect," RFC 6754, Oct. 2012, The Internet Society, Reston, VA, USA (twelve pages).

Wijnands et al., "Label Distribution Protocol Extensions for Point-to-Multipoint and Multipoint-to-Multipoint Label Switched Paths," RFC 6388, Nov. 2011, The Internet Society, Reston, VA, USA (thirty-nine pages).

Boers et al., "The Protocol Independent Multicast (PIM) Join Attribute Format," RFC 5384, Nov. 2008, The Internet Society, Reston, VA, USA (ten pages).

Holbrook et al., "Using Internet Group Management Protocol Version 3 (IGMPv3) and Multicast Listener Discovery Protocol Version 2 (MLDv2) for Source-Specific Multicast," RFC 4604, Aug. 2006, The Internet Society, Reston, VA, USA (eleven pages).

Fenner et al., "Protocol Independent Multicast—Sparse Mode (PIM-SM): Protocol Specification (Revised)," RFC 4601, Aug. 2006, The Internet Society, Reston, VA, USA (112 pages).

Polk and Dhesikan, "A Resource Reservation Protocol (RSVP) Extension for the Reduction of Bandwidth of a Reservation Flow," RFC 4495, May 2006, The Internet Society, Reston, VA, USA (twenty-one pages).

Gain et al., "Internet Group Management Protocol, Version 3," RFC 3376, Oct. 2002, The Internet Society, Reston, VA, USA (fifty-three pages).

Andersson et al., "LDP Specification," RFC 3036, Jan. 2001, The Internet Society, Reston, VA, USA (132 pages).

Rosen et al., "Multiprotocol Label Switching Architecture," RFC 3031, Jan. 2001, The Internet Society, Reston, VA, USA (sixty-one pages).

Estrin et al., "Protocol Independent Multicast-Sparse Mode (PIM-SM): Protocol Specification," RFC 2362, Jun. 1998, The Internet Society, Reston, VA, USA (sixty-six pages).

W. Fenner, "Internet Group Management Protocol, Version 2," RFC 2236, Nov. 1997, The Internet Society, Reston, VA, USA (twenty-four pages).

Braden et al., "Resource Reservation Protocol (RSVP)—Version 1 Functional Specification," RFC 2205, Sep. 1997, The Internet Society, Reston, VA, USA (112 pages).

* cited by examiner

ESTABLISHING A MULTICAST FLOW PATH THROUGH A NETWORK USING MULTICAST RESOURCES CURRENTLY ASSOCIATED WITH A DIFFERENT MULTICAST FLOW PATH

TECHNICAL FIELD

The present disclosure relates generally to packet switching network communications, including, but not limited to, improved packet network operations including those resulting from establishing a multicast flow path through a network using multicast resources currently associated with a different multicast flow path.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies, including for providing an Internet Protocol (IP) network for broadcast media (e.g., video and audio signals).

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
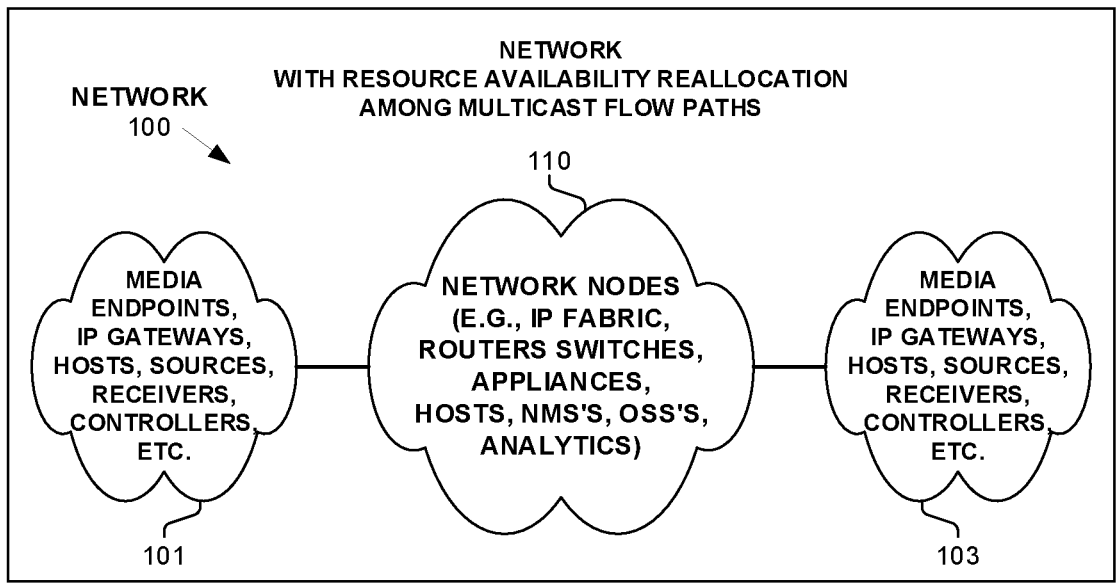
FIG. 1A illustrates a network operating according to one embodiment.

Disclosed are, inter alia, methods, apparatus, computer-storage media, mechanisms, and means associated with establishing a multicast flow path through a network using multicast resources currently associated with a different multicast flow path.

One embodiment includes a method, comprising: communicating a first plurality of packets of a first multicast flow path through a plurality of nodes in a network using network resources including one or more first network resources, with the plurality of nodes including a particular sending node communicatively coupled to a particular receiving node through one or more intermediate nodes; communicating a first multicast control message from the particular receiving node to a particular intermediate node of said one or more intermediate nodes, with the first multicast control message identifying to establish a second multicast flow path with resource availability reallocation from the first multicast flow path to the second multicast flow path, and with said first and second multicast flow paths associated with a different multicast source or a different multicast group; and responsive to the first multicast control message, the particular intermediate node performing guaranteed resource transfer flow path processing and establishing associated local multicast protocol state of the second multicast flow path in the particular intermediate node, with said guaranteed resource transfer flow path processing guaranteeing said one or more first network resources are reallocated from the first multicast flow path to the second multicast flow path and not to another multicast flow path.

One embodiment includes the particular intermediate node, being responsive to the first multicast control message, removing local multicast protocol state of the first multicast flow path from the particular intermediate node freeing up said one or more first network resources. One embodiment includes communicating, from the particular intermediate node to an adjacent upstream node of the plurality of nodes, a second multicast control message identifying to establish the second multicast flow path with resource availability reallocation from the first multicast flow path to the second multicast flow path.

In one embodiment, each of the first and second multicast control messages is a Protocol Independent Multicast-Sparse Mode (PIM-SM) Join/Prune Message identifying Pruning of the first multicast flow path and Joining of the second multicast flow path with resource availability reallocation from the first multicast flow path to the second multicast flow path. In one embodiment, a second Join request requiring said one or more first network resources is awaiting executing in the particular intermediate node at the time said performing guaranteed resource transfer flow path processing is begun.

In one embodiment, each of the first and second multicast control messages include a Multicast Label Distribution Protocol (mLDP) Label Withdraw message identifying removal of the first multicast flow path and a mLDP Label Mapping message identifying establishing of the second multicast flow path with resource availability reallocation from the first multicast flow path to the second multicast flow path.

In one embodiment, said one or more first network resources includes a particular bandwidth between adjacent nodes of the plurality of nodes. In one embodiment, said one or more first network resources includes a hardware or processing resource of the particular intermediate node.

In one embodiment, the particular receiving node is a multicast last hop router communicatively coupled to a particular multicast receiver; and wherein the particular sending node is a multicast first hop router communicatively coupled to a multicast source. In one embodiment, said one or more intermediate nodes comprise a single intermediate node. In one embodiment, said first and second multicast flow paths are associated with a same multicast source. In one embodiment, said first and second multicast flow paths are associated with a same multicast group.

One embodiment includes a method, comprising: sending, by an intermediate node of an Internet Protocol (IP) fabric of a network, packets of a first multicast flow path received from an adjacent upstream leaf node of the IP fabric to an adjacent downstream leaf node of the IP fabric, with the first multicast flow path allocated a particular bandwidth between the intermediate node and the adjacent upstream leaf node and between the intermediate node and the adjacent downstream leaf node; receiving, by the intermediate node, a first multicast control message from the adjacent downstream leaf node, with the first multicast control message identifying to establish a second multicast flow path with resource availability reallocation from the first multicast flow path to the second multicast flow path, and with said first and second multicast flow paths associated with a different multicast source or a different multicast group; responsive to the first multicast control message, the intermediate node performing guaranteed resource transfer flow path processing and establishing associated local multicast protocol state of the second multicast flow path, with said guaranteed resource transfer flow path processing guaranteeing availability of the particular bandwidth said allocated to the first multicast flow path and reallocating at least a portion of the particular bandwidth from the first multicast flow path to the second multicast flow path; and responsive to the first multicast control message, the intermediate node removing local multicast protocol state of the first multicast flow path from the intermediate node.

In one embodiment, said operations include: responsive to the first multicast control message, sending to the adjacent upstream leaf node of the IP fabric, a second multicast control message identifying to establish the second multicast flow path with resource availability reallocation from the first multicast flow path to the second multicast flow path. In one embodiment, the first multicast control message is a Protocol Independent Multicast-Sparse Mode (PIM-SM) Join/Prune Message identifying Pruning of the first multicast flow path and Joining of the second multicast flow path with resource availability reallocation from the first multicast flow path to the second multicast flow path. In one embodiment, the first multicast control message includes a Multicast Label Distribution Protocol (mLDP) Label Withdraw message identifying removal of the first multicast flow path and a mLDP Label Mapping message identifying establishing of the second multicast flow path with resource availability reallocation from the first multicast flow path to the second multicast flow path.

2. Example Embodiments

Disclosed are, inter alia, methods, apparatus, computer-storage media, mechanisms, and means associated with establishing a multicast flow path through a network using multicast resources currently associated with a different multicast flow path. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processor refers to a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and process block operations (e.g., a processor and memory or other apparatus configured to perform such operations) are disclosed and are in keeping with the extensible scope of the embodiments. The term "apparatus" is used consistently herein with its common definition of an appliance or device. The "router" (one type of packet switching device) is often used herein in describing one embodiment, with the teachings applicable to other types of packet switching devices (e.g., switches).

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1A illustrates a network 100 operating according to one embodiment, including using resource availability reallocation among multicast flow paths. As shown, network 100 includes an interconnecting network 110 of network nodes that provide the multicast flow paths (e.g., multicast distribution trees) to interconnect sets 101-103 of media endpoints, Internet Protocol (IP) gateways, end user networks, etc. Multicast streams flow between sources and groups over corresponding multicast flow paths. In one embodiment, network 110 is a diverse core network, such as that having a topology corresponding the needs of the traffic being transported. In one embodiment, network 110 includes a layer 3 IP fabric, such as, but not limited to, having a Clos topology. In one embodiment, multicast endpoints/nodes 101 and 103 communicate with edge/leaf nodes of network 110 using Internet Group Management Protocol (IGMP). IGMP is a protocol in which the destination (receiver) signals the intent to join a source or leave a source. In one embodiment, network 110 uses Protocol Independent Multicast (PIM) to signal among nodes messages related to multicast flow paths. In one embodiment, network 110 uses Multicast Label Distribution Protocol (mLDP) to signal among nodes messages related to multicast flow paths. In one embodiment, network 110 uses an Interior Gateway Protocol (IGP), such as, but not limited to Open Shortest Path First (OSPF), to advertise and distribute unicast routing information. In one embodiment, network 110 uses Multicast Source Discovery Protocol (MSDP) for establishing Rendezvous Points (RPs) to sync source information when running any source multicast.

Figure 1B:
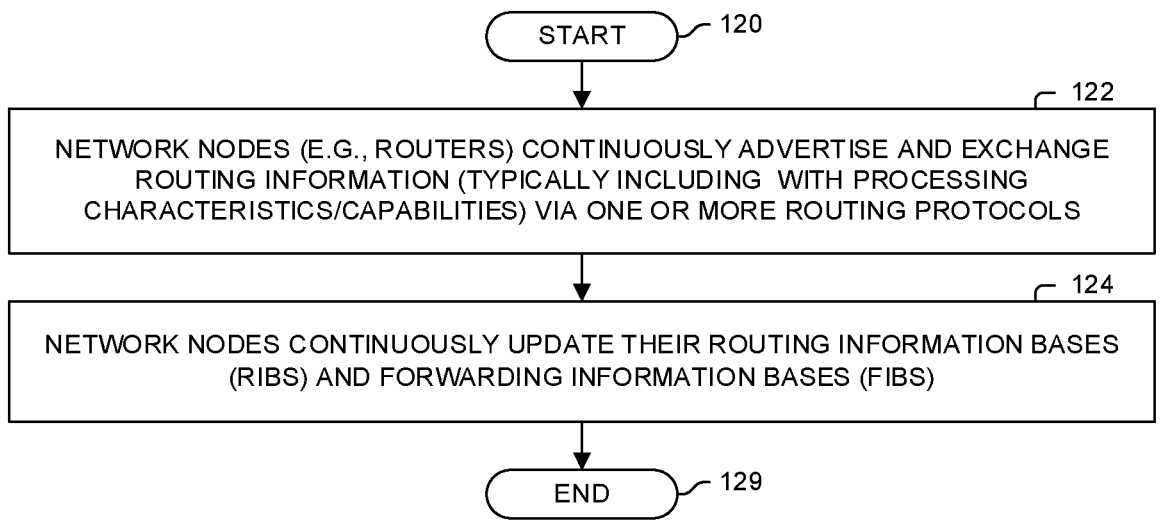
FIG. 1B illustrates a process according to one embodiment.

FIG. 1B illustrates a process according to one embodiment associated with advertising and distributing routing/forwarding information in a network (e.g., network 110 of FIG. 1A). Processing begins with process block 120. In process block 122, routers in the networks continuously advertise and exchange routing and forwarding information (e.g., IPv4 or IPv6 topology information) typically via one or more routing protocols (e.g., IGP) and/or other protocols (e.g., Label Distribution Protocol). In process block 124, these network nodes continuously update routing/forwarding information as required (e.g., based on information received via a routing or other protocol, from a network management system, from a path computation engine, etc.). Processing of the flow diagram of FIG. 1B is complete as indicated by process block 129.

Figure 1C:
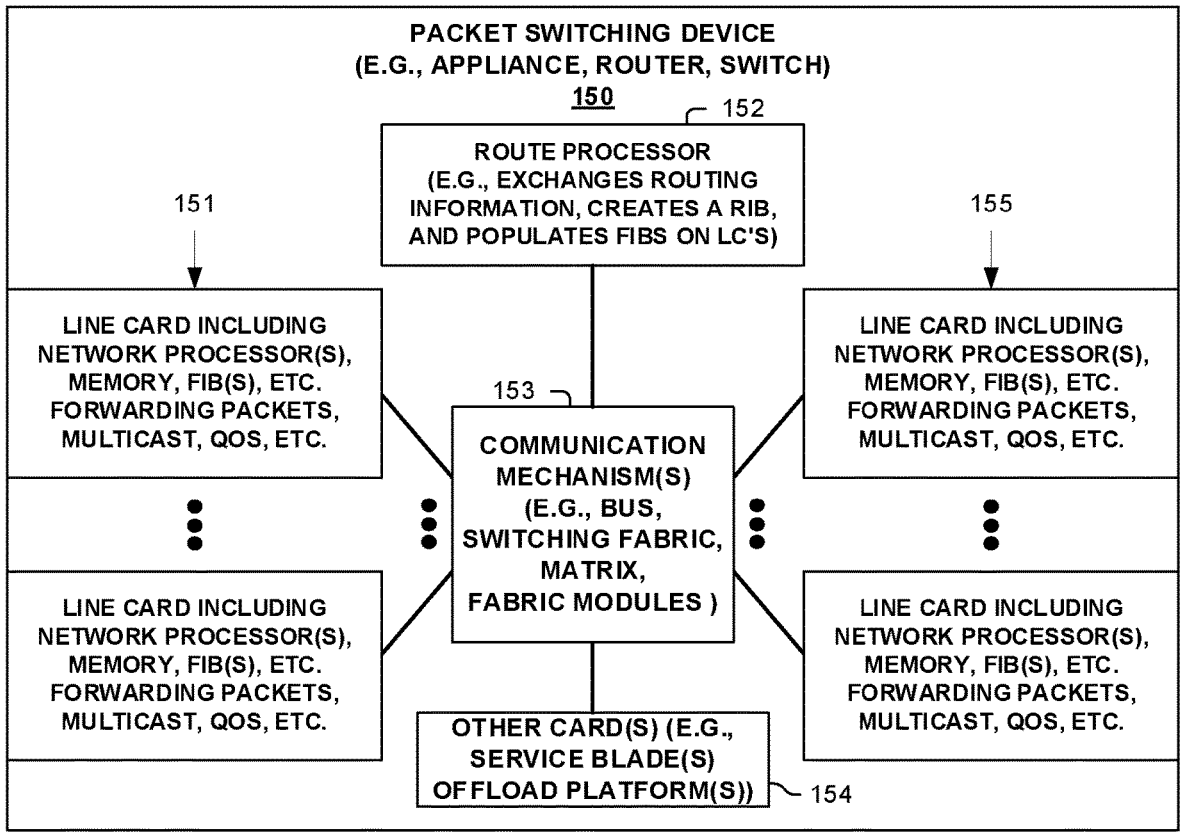
FIG. 1C illustrates a packet switching device according to one embodiment.

FIG. 1C illustrates one embodiment of a packet switching device 150 (e.g., router, node, switching, appliance, gateway) according to one embodiment. As shown, packet switching device 150 includes multiple line cards 151 and 155, each with one or more network interfaces for sending and receiving packets over communications links (e.g., possibly part of a link aggregation group), and with one or more processing elements that are used in one embodiment associated with establishing a multicast flow path through a network using multicast resources currently associated with a different multicast flow path. Packet switching device 150 also has a control plane with one or more processing elements (e.g., Route Processor(s)) 152 for managing the control plane and/or control plane processing of packets associated with improved network operations reactive to multicast control messages (e.g., PIM, mLDP). Packet switching device 150 also includes other cards 154 (e.g., service cards, blades) which include processing elements that are used in one embodiment to process (e.g., forward/send, drop, manipulate, change, modify, receive, create, duplicate, perform operations data processing functionality, apply a service) packets associated with associated with establishing a multicast flow path through a network using multicast resources currently associated with a different multicast flow path. Packet switching device 150 also includes some hardware-based communication mechanism 153 (e.g., bus, switching fabric, and/or matrix, etc.) for allowing its different entities 151, 152, 154 and 155 to communicate. Line cards 151 and 155 typically perform the actions of being both an ingress and egress line card, in regards to multiple other particular packets and/or packet streams being received by, or sent from, packet switching device 150. In one embodiment, operations data processing and storage functions are implemented on line cards 151, 155.

Figure 1D:
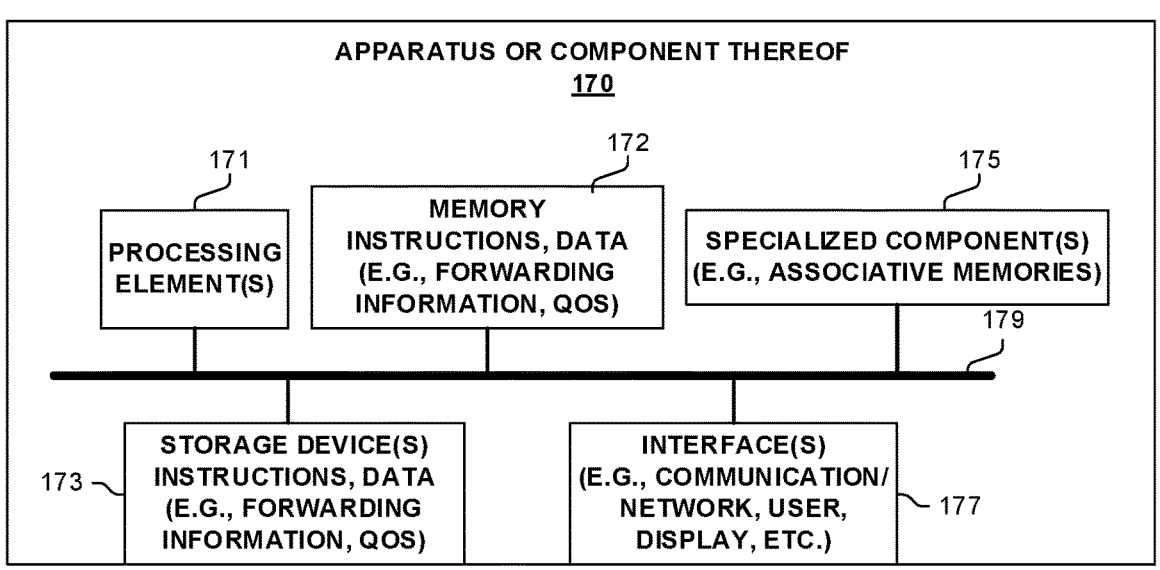
FIG. 1D illustrates an apparatus or component thereof according to one embodiment.

FIG. 1D is a block diagram of an apparatus 170 (e.g., host, router, node, destination, or portion thereof) used in one embodiment associated with establishing a multicast flow path through a network using multicast resources currently associated with a different multicast flow path. In one embodiment, apparatus 170 performs one or more processes, or portions thereof, corresponding to one of the flow diagrams illustrated or otherwise described herein, and/or illustrated in another diagram or otherwise described herein.

In one embodiment, apparatus 170 includes processor(s) 171 (typically with on-chip memory), memory 172 (possibly shared memory), storage device(s) 173, specialized component(s) 175 (e.g. optimized hardware such as for performing lookup, packet processing (e.g., including S-BFD reflector functionality and operations data processing); associative memory; binary and/or ternary content-addressable memory; Application Specific Integrated Circuit(s), cryptographic hash hardware, etc.), and interface(s) 177 for communicating information (e.g., sending and receiving packets, user-interfaces, displaying information, etc.), which are typically communicatively coupled via one or more communications mechanisms 179 (e.g., bus, links, switching fabric, matrix), with the communications paths typically tailored to meet the needs of a particular application.

Various embodiments of apparatus 170 may include more or fewer elements. The operation of apparatus 170 is typically controlled by processor(s) 171 using memory 172 and storage device(s) 173 to perform one or more tasks or processes. Memory 172 is one type of computer-readable/computer-storage medium, and typically comprises random access memory (RAM), read only memory (ROM), flash memory, integrated circuits, and/or other memory components. Memory 172 typically stores computer-executable instructions to be executed by processor(s) 171 and/or data which is manipulated by processor(s) 171 for implementing functionality in accordance with an embodiment. Storage device(s) 173 are another type of computer-readable medium, and typically comprise solid state storage media, disk drives, diskettes, networked services, tape drives, and other storage devices. Storage device(s) 173 typically store computer-executable instructions to be executed by processor(s) 171 and/or data which is manipulated by processor(s) 171 for implementing functionality in accordance with an embodiment.

Figure 2A:
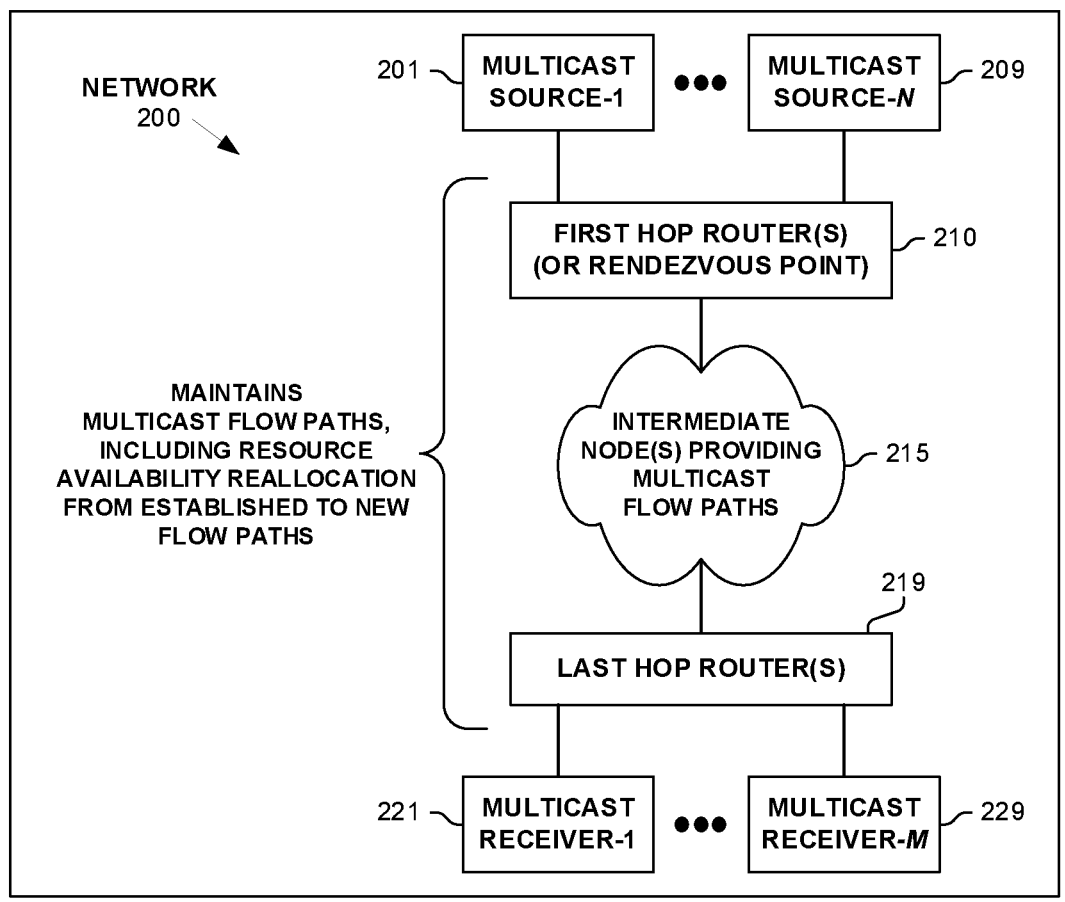
FIG. 2A illustrates a network operating according to one embodiment.

FIG. 2A illustrates a network operating according to one embodiment. As shown, network 200 includes multicast source(s) 201-209 communicatively coupled to first hop router(s) (or rendezvous point(s)) 210, and last hop router(s) 219 communicatively coupled to multicast receiver(s) 221-229. Network 215 includes interconnecting nodes, arranged as an IP switch fabric or other topology, communicatively coupling first hop router(s)/rendezvous point(s) 210 and last hop router(s) 219. Network 215 provides unicast routing of packets and multicast flow paths, including using resource availability reallocation from established to new flow paths.

As used herein, "resource availability reallocation" (and variants thereof) refers to the establishment of one or more designated multicast flow paths with guaranteed availability of resources currently allocated and/or used by one or more designated existing multicast flow paths to allocate/use for the newly established designated flow path(s). A multicast flow path is often referred to as a multicast distribution tree that determines multicast forwarding of packets of a multicast stream.

As used herein, "guaranteed availability of resources currently allocated and/or used by one or more designated existing multicast flow paths to allocate/use for the newly established designated flow path(s)" (and variants thereof) refers to making these currently allocated and/or used resources first available (e.g., allocated to, used by) to one or more newly established designated flow paths before releasing these resource for other uses (e.g., for other multicast flow path(s), unicast reserved paths).

As used herein, each of terms "resource" or "resources" refers to one or more resources (i.e., both terms cover singular and plural tense) used by a network or network node in providing its functionality, such as, but not limited to, providing a multicast flow path through the network. In one embodiment, resources include bandwidth between two adjacent or non-adjacent nodes of the network. In one embodiment, resources include multicast forwarding and/or processing resources (e.g., memory, associative memory, multicast or other tables, processing load, ports, queues) of a network node.

As used herein, "local multicast state" refers to multicast forwarding information stored in the node, such as, but not limited to, control plane and/or data plane information. In one embodiment, local multicast state includes a Tree Information Base (TIB) (e.g., a collection of state at a PIM router that has been created by receiving PIM Join/Prune messages, PIM Assert messages, and Internet Group Management Protocol (IGMP) or Multicast Listener Discovery (MLD) information from local hosts—it essentially stores the state of all multicast distribution trees at that router). In one embodiment, local multicast state includes a Multicast Forwarding Information Base or multicast routing table used to identify data plane processing (e.g., forwarding, replication) of individual multicast packets. In one embodiment, local multicast state includes a multicast policy table and/or current allocation/usage of resources associated with a multicast flow path.

Resource availability reallocation provides efficiencies and/or advantages in establishing new multicast flow paths as resources used by one or more established multicast flow paths are guaranteed to be available for establishing one or more new multicast flow paths. In one embodiment, resource availability reallocation reduces the delay in establishing a new multicast flow path as multicast-related information is modified without having to perform as much data manipulation (e.g., a new data structure entry of the prior multicast flow path is overwritten instead of creating a new entry).

Resource availability reallocation especially provides advantages and efficiencies in a resource constrained network, where there can be contention for these resources to transport multicast and unicast packet traffic. In one embodiment, a client switches between multicast forwarding paths in providing its media or other services. It is typically unacceptable to a client that it cannot continue providing its content over a new multicast flow path for the reason that there are not enough resources available to establish the new multicast flow path when the resources associated with (e.g., allocated, used) the established multicast path are released by the client. This problem may be exacerbated by multicast protocols, such as PIM, that establish multicast flow paths in a distributed node-by-node fashion (in contrast to a centralized provisioning system), and that do not specify an ordering for processing of Prune and Join messages. A current implementation that processes Join messages in a first-in-first-out (FIFO) order allows Pruned resources to be used by a pending Join of another user rather than using to satisfy a PIM join of the customer.

One embodiment reduces or eliminates this situation by guaranteeing that the resources no longer used by the old multicast flow path(s) are made available for the establishment of the new multicast flow path(s) before being released for use for other multicast flow paths (e.g., those of other users). Thus, one embodiment guarantees resource availability for a new multicast flow path(s) when the new and prior multicast flow paths traverse a same path through the network and the resources required for the new multicast flow path(s) are less than or equal to those used by the old multicast flow path(s). In one embodiment, when the path through the network is divergent, one embodiment still guarantees availability of the released resources of each portion of the network that overlaps. In one embodiment, when additional resources (e.g., greater bandwidth) are required for the new multicast flow path, the new multicast flow path still is guaranteed first right of refusal for use of the resources of the prior multicast flow path.

Figure 2B:
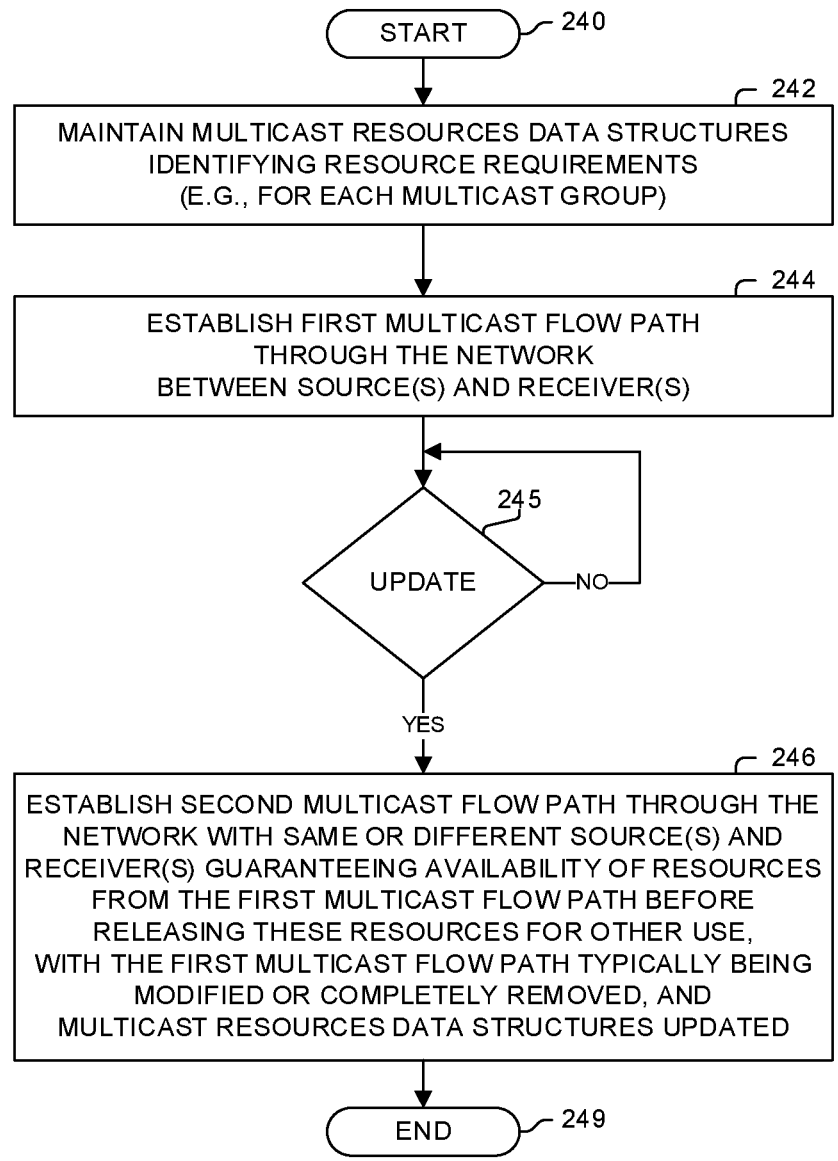
FIG. 2B illustrates a process according to one embodiment.

FIG. 2B illustrates a process used in one embodiment. Processing begins with process block 240. As indicated by process block 242, multicast resource data structures identifying resources requirements and usage for at least each multicast group are maintained in the network. In process block 244, the first multicast flow path is established between its designated source(s) and receiver(s). Processing remains at process block 245 until a second multicast flow path is to be established, then processing proceeds to process block 246. In process block 246, the second multicast flow path, with same or different source(s) and receiver(s), is established through the network with guaranteed availability of resources from the first multicast flow path before releasing these resources for other use, with the first multicast flow path typically being modified or completely removed, and multicast resources data structures updated. Processing of the flow diagram of FIG. 2B is complete as indicated by process block 249.

Figure 3A:
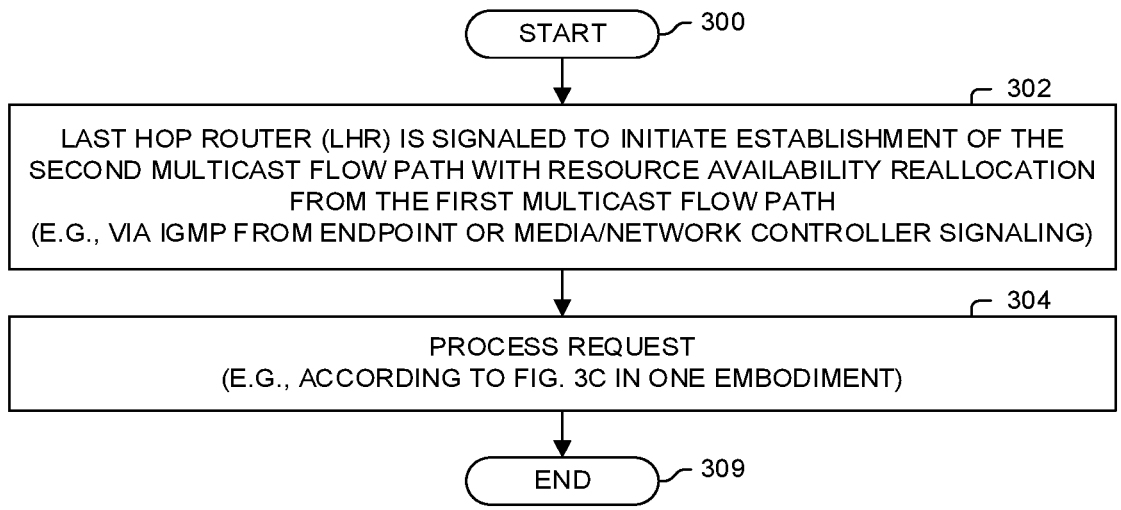
FIG. 3A illustrates a process according to one embodiment.

FIG. 3A illustrates a process used in one embodiment by a network node, typically by a last hop router (LHR). Processing begins with process block 300. In process block 302, the LHR is signaled to initiate establishment of a second multicast flow path with resource availability reallocation from the first multicast flow path to the second multicast flow path, and with said first and second multicast flow paths associated with a different multicast source or a different multicast group. In one embodiment, a media controller (e.g., responsive to a broadcast controller) or network controller signals the LHR. In one embodiment, Internet Group Membership Protocol (IGMP) is used to signal the LHR from one or more endpoints, IP gateways, receiving devices, etc. In one embodiment, Auxiliary Data field(s) per multicast group of IGMPv3 Join packets is used signal this information. In one embodiment, this enhanced IGMPv3 Join packet includes a flag bit to signal the use of resources availability reallocation. In process block 304, this request is processed, such as, but not limited to, the processing described in relation to FIG. 3C. Processing of the flow diagram of FIG. 3A is complete as indicated by process block 309.

Figure 3B:
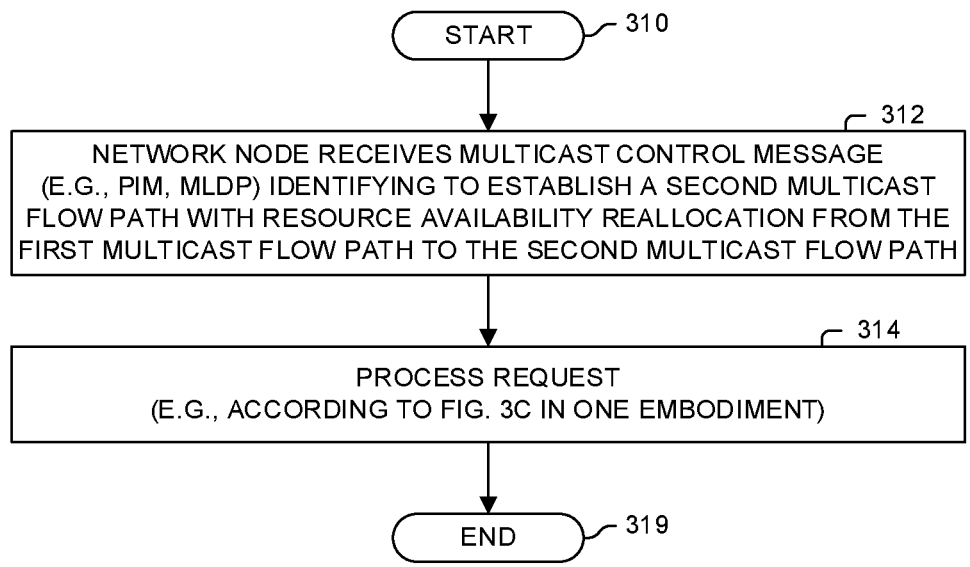
FIG. 3B illustrates a process according to one embodiment.

FIG. 3B illustrates a process used in one embodiment by a network node, typically by an intermediate node or first hop router (FHR). Processing begins with process block 310. In process block 312, the network node received a multicast control message (e.g., PIM, mLDP) identifying to establish one or more second multicast flow paths with resource availability reallocation from one or more first multicast flow paths to the second multicast flow path(s), and with said first and second multicast flow paths associated with a different multicast source or a different multicast group.

In one embodiment, a multicast control message is a Protocol Independent Multicast-Sparse Mode (PIM-SM) Join/Prune Message identifying Pruning of one or more first multicast flow paths and Joining of one or more second multicast flow paths with resource availability reallocation from the first multicast flow path(s) to the second multicast flow path(s). In one embodiment, the PIM Join/Prune message consists of a list of groups and a list of Joined and Pruned sources for each group, and designation of an association between one or more Prunes and one or more Joins for resource availability reallocation. In one embodiment, the association designation identifies a manner to match the Join and Prune requests for resource availability reallocation. In one embodiment, the association designation identifies all Prunes and Joins in the message are associated for resource availability reallocation. In one embodiment, the association designation identifies one or more subsets of Prunes and Joins in the message are associated for resource availability reallocation (e.g., each Prune is associated with one Join in the listing order within the message).

In one embodiment, this included association designation causes a network node to process a set of associated Joins and Prunes in a manner that guarantees that the resources associated with the corresponding Pruned multicast flow path(s) are available for the Joined multicast flow path(s).

In one embodiment, multicast processing of associated Prunes and Joins is performed as an atomic operation in that the associated Prunes are first processed and then the associated Joins are processed. Only thereafter are other Prune/Join requests processed.

One embodiment processes a received PIM Join/Prune Message with a resource availability reallocation as an atomic operation in that all Prunes in the message are first processed, then all of the Joins in the order listed in the message. Only thereafter are other Prune/Join requests processed.

In contrast, a prior approach, when processing a received Join/Prune message, each Joined or Pruned source for a group is effectively considered individually. Therefore, this prior approach does not provide guaranteed resource availability reallocation from the designated Pruned multicast flow path(s) to the designated Joined multicast flow path(s).

In one embodiment, this association designation is encoded in the PIM Join/Prune message, such as, but not limited to, in one or more flags, values, identifiers in a Type-Length-Value (TLV) field or another field of the message. In one embodiment, the designation of resource availability reallocation and the associated Prune and Join requests are identified in one or more attributes. PIM Join attributes allow for specifying a set of attributes for each of the joined or pruned sources in a PIM Join/Prune message, with these attributes separately specified for each individual source in the message. One embodiment uses a hierarchical way of encoding attributes and their values in a Join/Prune message so that if the same attribute and value is to apply for all the sources, it only needs to be specified once in the message. Similarly, if all the sources in a specific group set share a specific attribute and value, it only needs to be specified once for the entire group set.

Figure 3C:
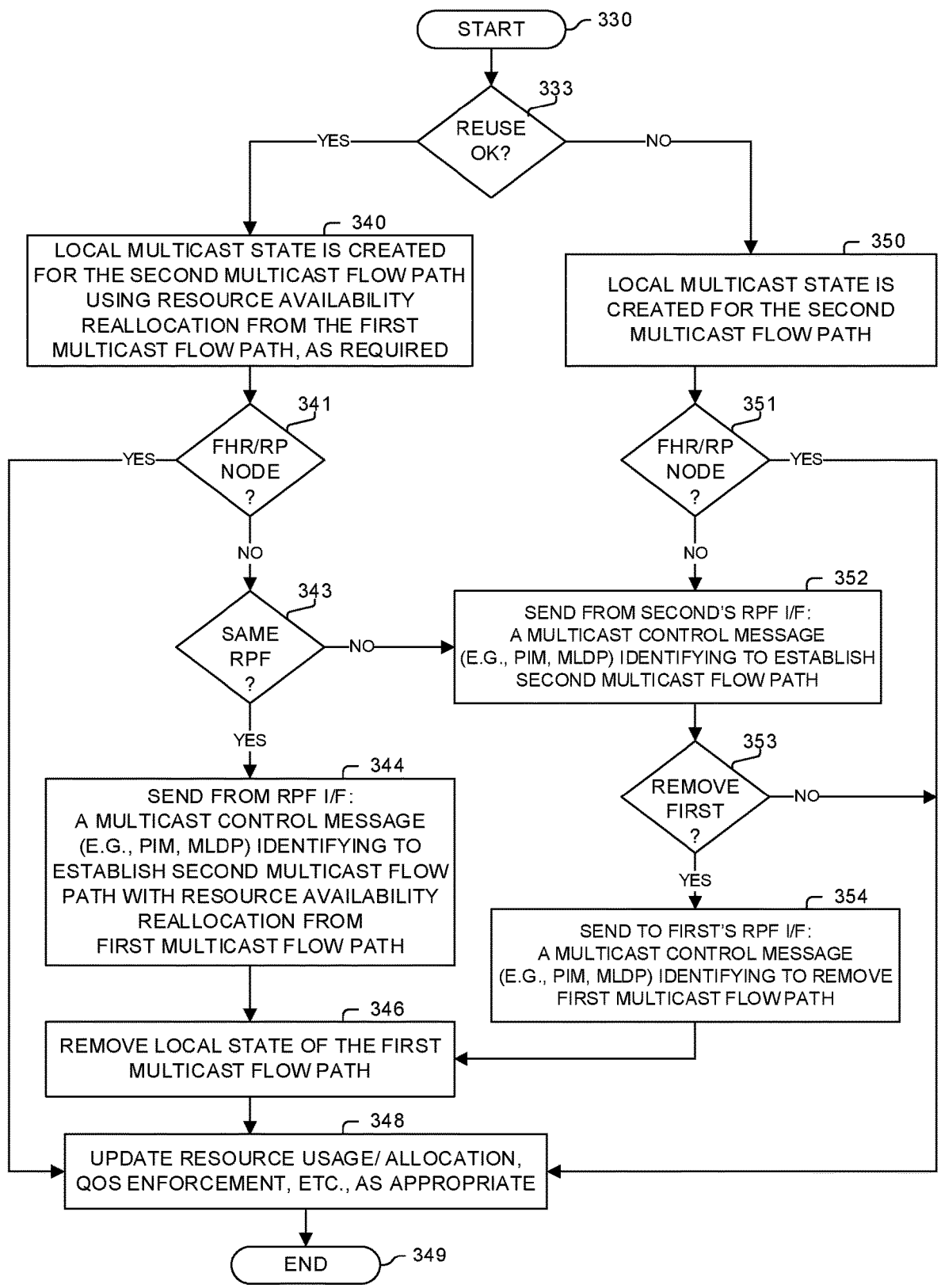
FIG. 3C illustrates a process according to one embodiment.

Continuing with the processing of FIG. 3B, in process block 314, the request in the received multicast control message is processed, such as, but not limited to, the processing described in relation to FIG. 3C. Processing of the flow diagram of FIG. 3B is complete as indicated by process block 319.

FIG. 3C illustrates a process performed in one embodiment of a network node in response to a received request to establish a designated second multicast flow path with resource availability reallocation from a designated first multicast flow path. Processing begins with process block 330, and proceeds to process block 333.

As determined in process block 333, if reuse of the resources associated with the first multicast flow is approved, then processing proceeds to process block 340 to perform the requested task. Otherwise, processing proceeds to process block 350 to establish the second multicast flow path without resource availability reallocation nor removing the first multicast flow path. One embodiment drops the entire request in response to determining that the request is not approved. In one embodiment, all requests are approved. In one embodiment, the request is approved only if the associated client is authorized for the entire operation (e.g., do not allow certain clients to remove and/or establish a multicast flow path). In one embodiment, the request is approved only if the interface on which the request received is the only interface used to send packets of the multicast stream (e.g., no other downstream nodes or receivers). In one embodiment, the request is only approved if the each of the resources required for the second multicast flow path is less than the corresponding resource allocated and/or used by the first multicast flow path.

Continuing with process block 340, local multicast state is created for the second multicast flow path using resource availability reallocation from the first multicast flow path as required. Next, as determined in process block 341, if the current node is the first hop router or rendezvous point (e.g., the multicast path has been established through the network), processing proceeds to process block 348; otherwise processing proceeds to process block 343. As determined in 343, if both the first and second multicast flow paths have the same reverse path forwarding RPF interface, then processing proceeds to process block 344; otherwise, processing proceeds to process block 352. In process block 344, a multicast control message is sent to the adjacent network node via the RPF interface, with the multicast control message identifying to establish the second multicast flow path with resource availability reallocation from the first multicast flow path to the second multicast flow path, and with said first and second multicast flow paths associated with a different multicast source or a different multicast group. Processing proceeds to process block 346.

Continuing in process block 350 (for creating the second multicast flow path without removing the first multicast flow path), local multicast state is created for the second multicast flow path in the network node. As determined in process block 351, if the current node is the first hop router or rendezvous point (e.g., the multicast path has been established through the network), processing proceeds to process block 348; otherwise processing proceeds to process block 352.

Continuing in process block 352, a multicast control message is sent to the adjacent network node via the RPF interface for the second multicast flow path, with the multicast control message identifying to establish the second multicast flow path. As determined in processing block 353, if the first multicast flow path is to be removed, then processing proceeds to processing block 354; otherwise, processing proceeds to processing block 348. In processing block 354, a multicast control message is sent to the adjacent network node via the RPF interface, with the multicast control message identifying to remove (e.g., Prune, Label Withdraw) the first multicast flow path. Processing proceeds to process block 346.

Continuing in processing block 346, local multicast state of the first multicast flow path is removed from the network node. Processing proceeds to processing block 348.

Continuing in processing block 348, resource allocation/usage/availability, Quality of Service enforcement mechanisms, and other information changed by the processing of FIG. 3C is updated. Processing of the flow diagram of FIG. 3C is complete as indicated by processing block 349.

Figure 4A:
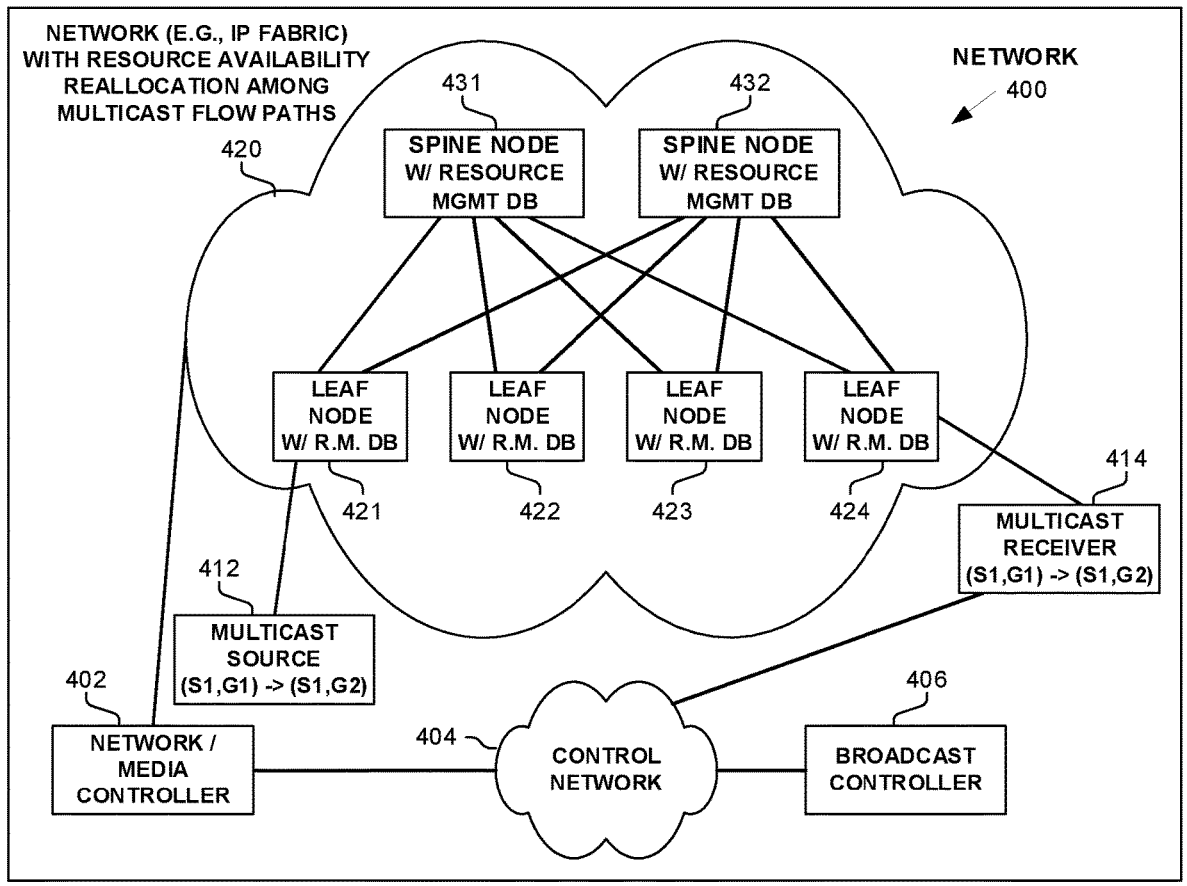
FIG. 4A illustrates a network operating according to one embodiment.

FIGS. 4A-4E illustrate the operation of one embodiment using network 400, and in particular network 420, of FIG. 4A, in which a first multicast flow path (S1,G1) is used; and subsequently, a second multicast flow path (S1, G2) is established using resource availability reallocation from the first multicast flow path (S1, G1).

FIG. 4A illustrates a network 400 according to one embodiment. Communicatively coupled as shown, network 400 includes a core network 420 (e.g., an IP fabric) including leaf nodes 421-424 and spine nodes 431-432; multicast source 412, multicast receiver 414, a network/media controller 402, broadcast controller 406, and control network 404.

In one embodiment, a Non-Blocking Multicast (NBM) process provides bandwidth awareness to Protocol Independent Multicast (PIM), including defining flow policies stored in the nodes of the multicast distribution network. NBM ensures an endpoint interface is not oversubscribed by only allowing flows that do not exceed the interface bandwidth. As an example, if the flow policy for groups 239.1.1.1 to 239.1.1.10 used by 3G HD video is set to 3.3 Gbps and the source is connected to a 10-Gbps interface, only the first three flows transmitted by the source are accepted. Even if the actual bandwidth utilized is less than the link capacity, NBM reserves bandwidth specified in the flow policy. The fourth flow would exceed 10 Gbps, hence it is rejected. On the receiver or destination side, the same logic applies. When a receiver tries to subscribe to more traffic that the link capacity allows, the request is denied.

In one embodiment, each of spine nodes 431-432 and leaf nodes 421-424 includes local multicast state that includes a resource management database (e.g., a flow policy table for each group; a current usage table for each group). In one embodiment, only spine nodes 431-432 include the resource management database (e.g., in a Clos network with a single routing stage of spine nodes, bandwidth/resource allocation is performed in the spine nodes for multicast flow paths).

Figure 4B:
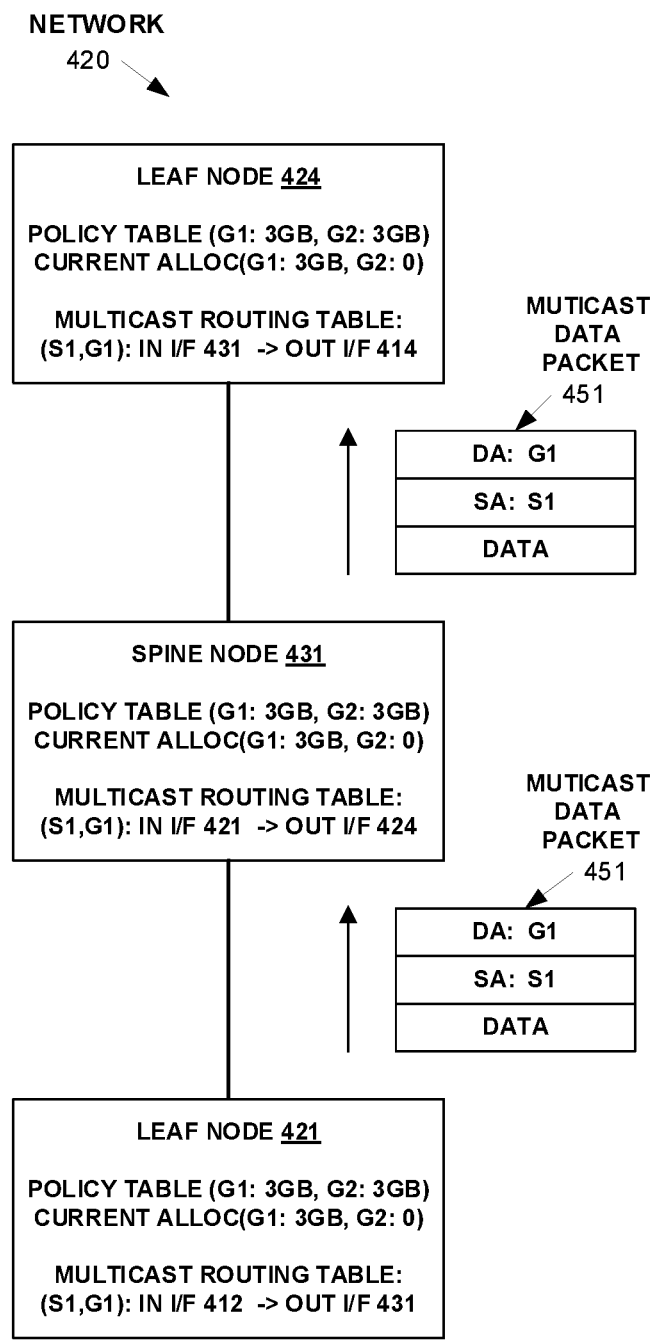
FIG. 4B illustrates a network operating according to one embodiment.

As shown in FIG. 4B and at a first time, the first multicast flow path (S1, G1) has been established through network 420 coupling multicast source 412 to multicast receiver 414, the first multicast flow path (S1, G1) traverses leaf node 421, spine node 431, and leaf node 424.

In one embodiment, each of leaf nodes 421 and 424 and spine node 431 includes local multicast state that includes resource management databases, comprising: a policy table specifying bandwidth requirements for each of the first and second flow paths keyed on the respective multicast group G1 and G2; and a table storing current allocation/usage/availability for each of the first and second flow paths keyed on the respective multicast group G1 and G2. In one embodiment, only spine node 431 stores the policy table (e.g., in a Clos network with a single routing stage of spine nodes, bandwidth/resource allocation is performed in the spine nodes for multicast flow paths). In one embodiment, the bandwidth resource requirements for each of G1 and G2 is 3 GB.

Further, each of leaf nodes 421 and 424 and spine node 431 includes local multicast state including a multicast routing table identifying incoming interface(s) and outgoing interface(s) for currently active multicast flow paths. In one embodiment, a single multicast flow path (S1, G1) is currently active, with the input and output interfaces identifying reference numerals from FIG. 4A; and the current bandwidth allocation table identifying 3G for G1, and 0 for G2. As shown in FIG. 4B, each multicast data packet 451 of (S1, G1) flows from leaf node 421 to spine node 431 to leaf node 424.

Figure 4C:
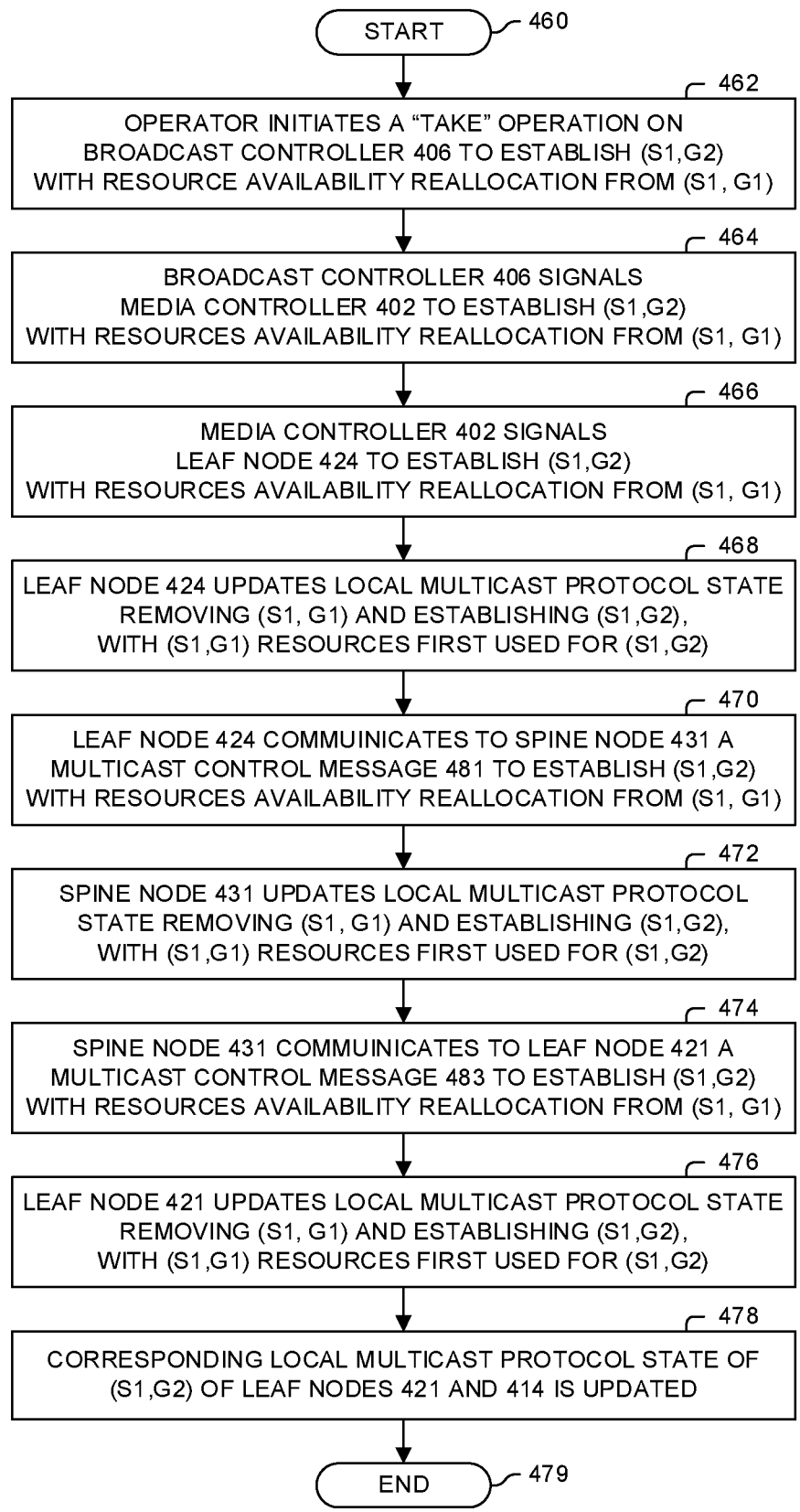
FIG. 4C illustrates a process according to one embodiment.
Figure 4D:
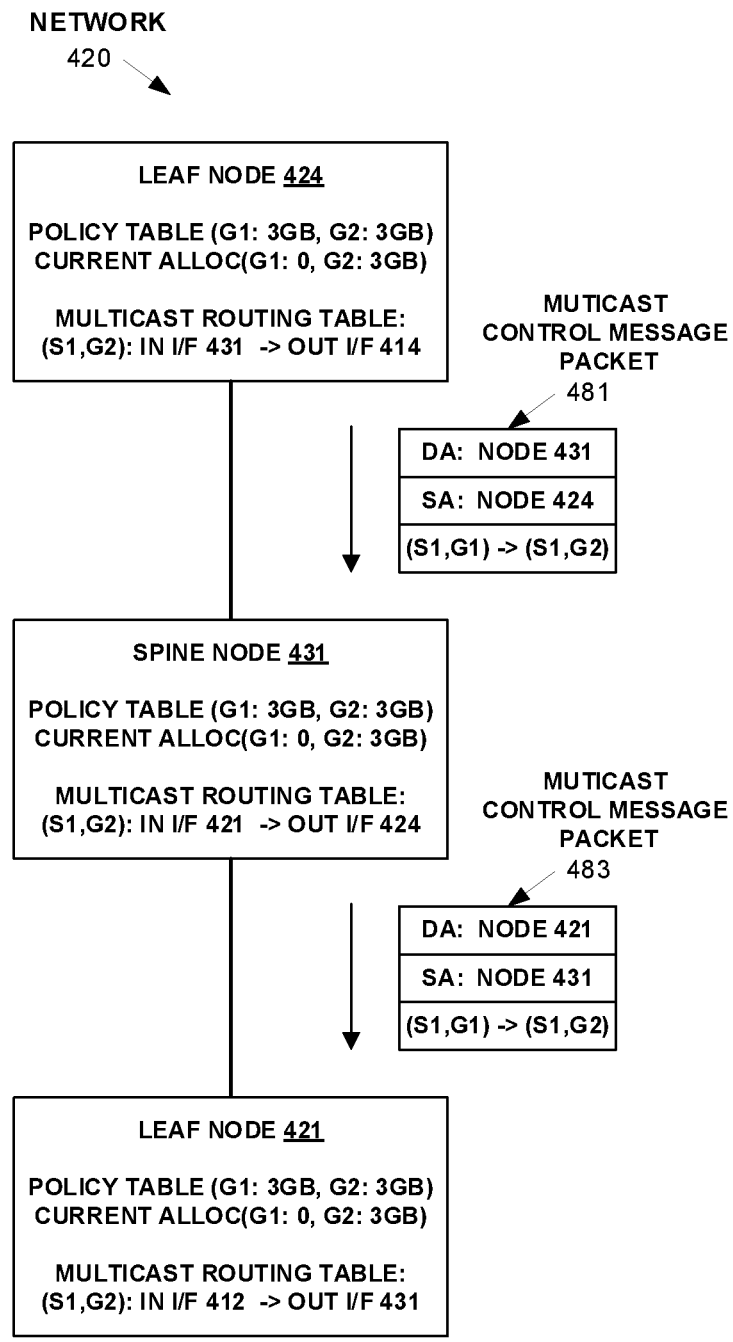
FIG. 4D illustrates a network operating according to one embodiment.

FIGS. 4C-D illustrates a process performed in one embodiment of network 400, with multicast flow path (S1, G1) in use as described in relation to FIGS. 4A-B. FIG. 4C is a flow diagram, and FIG. 4D is an annotated network diagram.

Processing of the flow diagram of FIG. 4C begins with processing block 460. In processing block 462, an operator initiates a "take" operation on broadcast controller 406 to establish (S1, G2) with resources availability reallocation from (S1, G1). In one embodiment, this operation corresponds to a media operator initiating a "take" operation to switch the source and/or group of a multicast flow path to provide same or different video/audio streams (e.g., the multicast source) and/or to same or different receivers (e.g., the multicast group).

In processing block 464, broadcast controller 406 signals media controller 402 to establish (S1, G2) with resource availability reallocation from (S1, G1). In processing block 466, media controller 402 signals leaf node 424 to establish (S1, G2) with resource availability reallocation from (S1, G1). In processing block 468, leaf node 424 updates local multicast protocol state removing (S1, G1) and establishing (S1, G2), with (S1, G1) resources first allocated to/used for establishing multicast flow path (S1, G2). Updated state information of node 424 is illustrated in FIG. D, with its prior state information illustrated in FIG. 4B.

In processing block 470, leaf node 424 communicates to spine node 431 a multicast control message (481, FIG. 4C) to establish (S1, G2) with resource availability reallocation from (S1, G1) as indicated by the notation of "(S1,G1)→(S1,G2)". In processing block 472, spine node 431 updates local multicast protocol state removing (S1, G1) and establishing (S1, G2), with (S1, G1) resources first allocated to/used for establishing multicast flow path (S1, G2). Updated state information of node 431 is illustrated in FIG. D, with its prior state information illustrated in FIG. 4B.

In processing block 474, spine node 431 communicates to leaf node 421 a multicast control message (483, FIG. 4C) to establish (S1, G2) with resource availability reallocation from (S1, G1) as indicated by the notation of "(S1,G1)→(S1,G2)". In processing block 476, leaf node 421 updates local multicast protocol state removing (S1, G1) and establishing (S1, G2), with (S1, G1) resources first allocated to/used for establishing multicast flow path (S1, G2). Updated state information of node 421 is illustrated in FIG. D, with its prior state information illustrated in FIG. 4B.

In processing block 478, corresponding local multicast protocol state of (S1, G2) of multicast source node 412 is updated. In one embodiment, corresponding local multicast protocol state of (S1, G2) of multicast receiver node 414 is updated, if not already updated. Processing of the flow diagram of FIG. 4C is complete as indicated by processing block 479.

Figure 4E:
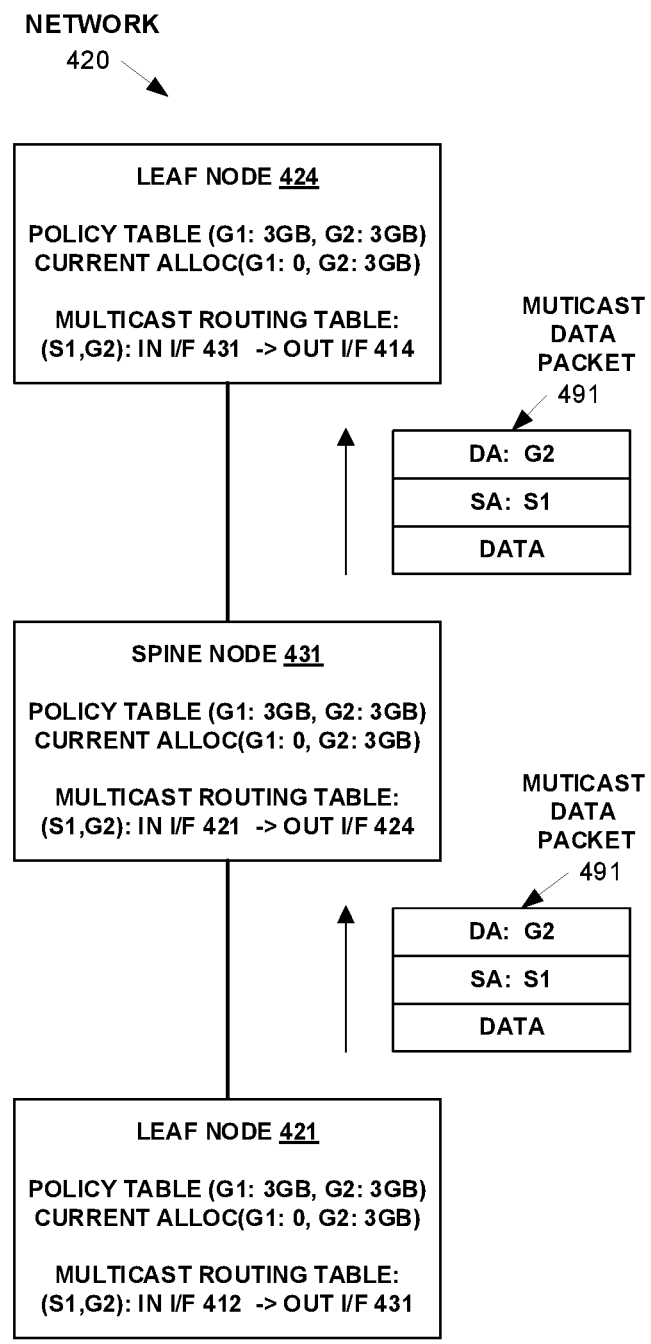
FIG. 4E illustrates a network operating according to one embodiment.

As shown in FIG. 4E, the established second multicast flow path (S1, G2) traverses leaf node 421, spine node 431, and leaf node 424, with packets 491 of the multicast stream being communicated over the second multicast flow path (S1, G2).

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   communicating a first plurality of packets of a first multicast flow path through a plurality of nodes in a network using network resources including one or more first network resources, with the plurality of nodes including a particular sending node communicatively coupled to a particular receiving node through one or more intermediate nodes;
   communicating a first multicast control message from the particular receiving node to a particular intermediate node of said one or more intermediate nodes, with the first multicast control message designating to establish a second multicast flow path and designating to use resource availability reallocation of resources from the first multicast flow path to the second multicast flow path, and with said first and second multicast flow paths having a different multicast source or a different multicast group; and
   responsive to the first multicast control message, the particular intermediate node performing guaranteed resource transfer flow path processing and establishing associated local multicast protocol state of the second multicast flow path in the particular intermediate node, with said guaranteed resource transfer flow path processing guaranteeing said one or more first network resources are reallocated from the first multicast flow path to the second multicast flow path and not to another multicast flow path.

2. The method of claim 1, comprising the particular intermediate node, being responsive to the first multicast control message, removing local multicast protocol state of the first multicast flow path from the particular intermediate node freeing up said one or more first network resources.

3. The method of claim 2, comprising: communicating, from the particular intermediate node to an adjacent upstream node of the plurality of nodes, a second multicast control message designating to establish the second multicast flow path and designating to use resource availability reallocation of resources from the first multicast flow path to the second multicast flow path.

4. The method of claim 3, wherein each of the first and second multicast control messages is a Protocol Independent Multicast-Sparse Mode (PIM-SM) Join/Prune Message designating Pruning of the first multicast flow path and designating Joining of the second multicast flow path using resource availability reallocation of resources from the first multicast flow path to the second multicast flow path.

5. The method of claim 4, where said one or more first network resources includes a particular bandwidth between adjacent nodes of the plurality of nodes.

6. The method of claim 4, wherein said one or more first network resources includes a hardware or processing resource of the particular intermediate node.

7. The method of claim 3, wherein each of the first and second multicast control messages include a Multicast Label Distribution Protocol (mLDP) Label Withdraw message designating removal of the first multicast flow path and a mLDP Label Mapping message designating establishing of the second multicast flow path using resource availability reallocation of resources from the first multicast flow path to the second multicast flow path.

8. The method of claim 1, wherein the first multicast control message is a Protocol Independent Multicast-Sparse Mode (PIM-SM) Join/Prune Message designating Pruning of the first multicast flow path and designating Joining of the second multicast flow path using resource availability reallocation of resources from the first multicast flow path to the second multicast flow path.

9. The method of claim 8, wherein a second Join request requiring said one or more first network resources is awaiting executing in the particular intermediate node at the time said performing guaranteed resource transfer flow path processing is begun.

10. The method of claim 1, wherein the first multicast control message includes a Multicast Label Distribution Protocol (mLDP) Label Withdraw message designating removal of the first multicast flow path and a mLDP Label Mapping message designating establishing of the second multicast flow path using resource availability reallocation of resources from the first multicast flow path to the second multicast flow path.

11. The method of claim 1, wherein the particular receiving node is a multicast last hop router communicatively coupled to a particular multicast receiver; and wherein the particular sending node is a multicast first hop router communicatively coupled to a multicast source.

12. The method of claim 11, wherein said one or more intermediate nodes comprise a single intermediate node.

13. The method of claim 1, wherein said first and second multicast flow paths have a same multicast source.

14. The method of claim 1, wherein said first and second multicast flow paths have a same multicast group.

15. The method of claim 1, wherein said first and second multicast flow paths have a different multicast source.

16. The method of claim 1, wherein said first and second multicast flow paths have a different multicast group.

17. A method, comprising:

sending, by an intermediate node of an Internet Protocol (IP) fabric of a network, packets of a first multicast flow path received from an adjacent upstream leaf node of the IP fabric to an adjacent downstream leaf node of the IP fabric, with the first multicast flow path allocated a particular bandwidth between the intermediate node and the adjacent upstream leaf node and between the intermediate node and the adjacent downstream leaf node;

receiving, by the intermediate node, a first multicast control message from the adjacent downstream leaf node, with the first multicast control message designating to establish a second multicast flow path and designating to use resource availability reallocation of resources from the first multicast flow path to the second multicast flow path, and with said first and second multicast flow paths having a different multicast source or a different multicast group;

responsive to the first multicast control message, the intermediate node performing guaranteed resource transfer flow path processing and establishing associated local multicast protocol state of the second multicast flow path, with said guaranteed resource transfer flow path processing guaranteeing availability of the particular bandwidth said allocated to the first multicast flow path and reallocating at least a portion of the particular bandwidth from the first multicast flow path to the second multicast flow path; and responsive to the first multicast control message, the intermediate node removing local multicast protocol state of the first multicast flow path from the intermediate node.

18. The method of claim 17, comprising: responsive to the first multicast control message, the intermediate node sending to the adjacent upstream leaf node of the IP fabric, a second multicast control message designating to establish the second multicast flow path and designating to use resource availability reallocation of resources from the first multicast flow path to the second multicast flow path.

19. The method of claim 17, wherein the first multicast control message is a Protocol Independent Multicast-Sparse Mode (PIM-SM) Join/Prune Message designating Pruning of the first multicast flow path and designating Joining of the second multicast flow path using resource availability reallocation of resources from the first multicast flow path to the second multicast flow path.

20. An intermediate node, comprising, comprising:

one or more processors;

memory;

one or more interfaces sending and receiving packets to nodes of an Internet Protocol (IP) fabric of a network;

wherein the intermediate node performs operations including:

sending packets of a first multicast flow path received from an adjacent upstream leaf node of the IP fabric to an adjacent downstream leaf node of the IP fabric, with the first multicast flow path allocated a particular bandwidth between the intermediate node and the adjacent upstream leaf node and between the intermediate node and the adjacent downstream leaf node;

receiving a first multicast control message from the adjacent downstream leaf node, with the first multicast control message designating to establish a second multicast flow path and designating to use resource availability reallocation of resources from the first multicast flow path to the second multicast flow path, and with said first and second multicast flow paths having a different multicast source or a different multicast group;

responsive to the first multicast control message, performing guaranteed resource transfer flow path processing and establishing associated local multicast protocol state of the second multicast flow path, with said guaranteed resource transfer flow path processing guaranteeing availability of the particular bandwidth said allocated to the first multicast flow path and reallocating at least a portion of the particular bandwidth from the first multicast flow path to the second multicast flow path; and responsive to the first multicast control message, removing local multicast protocol state of the first multicast flow path from the intermediate node.

21. The intermediate node of claim 20, wherein said operations include: responsive to the first multicast control message, sending to the adjacent upstream leaf node of the IP fabric, a second multicast control message designating to establish the second multicast flow path and designating to use resource availability reallocation of resources from the first multicast flow path to the second multicast flow path.

22. The intermediate node of claim 20, wherein the first multicast control message is a Protocol Independent Multicast-Sparse Mode (PIM-SM) Join/Prune Message designating Pruning of the first multicast flow path and designating Joining of the second multicast flow second multicast flow path using resource availability reallocation of resources from the first multicast flow path to the second multicast flow path.

* * * * *